United States Patent Office 3,585,229
Patented June 15, 1971

3,585,229
DECOLORIZATION OF AROMATIC
ISOCYANATES
Daniel T. Christian, San Leandro, and Melvin Look, El
Cerrito, Calif., assignors to Kaiser Aluminum & Chemical Corporation, Oakland, Calif.
No Drawing. Filed June 21, 1968, Ser. No. 738,788
Int. Cl. C07c 119/04
U.S. Cl. 260—453                                    5 Claims

ABSTRACT OF THE DISCLOSURE

Discolored aromatic polyisocyanates containing methylenediphenyl diisocyanates are decolorized by the addition of diphenyl-decyl phosphite. The decolorization is effected by reacting or chemically bonding the hydrolyzable chloride attached to the methylene bridge of the diisocyanate.

BACKGROUND OF THE INVENTION

This invention relates to bleaching and decolorizing discolored methylene-diphenyl diisocyanate and aromatic polyisocyanates containing methylene-diphenyl diisocyanate by the addition of diphenyl-decyl phosphite in an amount sufficient to react with or chemically bond substantially all of the color forming hydrolyzable chloride attached to the methylene-bridge of the diisocyanate. Methylene-diphenyl diisocyanates and aromatic polyisocyanates containing substantial amounts of the methylene-diphenyl diisocyanates are commonly used in the preparation of adhesives, coatings and they serve as valuable intermediates for the production of urethanes. Urethanes are widely employed either in liquid or in foamed form for insulations, packaging and many other purposes.

Methylene-diphenyl isocyanates and aromatic polyisocyanates containing substantial amounts of methylene-diphenyl diisocyanates can be prepared by the condensation of aniline and formaldehyde, followed by the phosgenation of the condensate. The phosgenated product very often displays a yellow or even brownish color and this color renders the isocyanate unsuitable for many applications, where a colorless or light colored isocyanate is desired or required. It was already recognized that during storage of isocyanates an undesirable color may form due to oxidation or other chemical reactions resulting in decomposition. The prior art efforts, however, were all directed to the stabilization of colorless isocyanates, to prevent the formation of this undesirable color. To prevent discoloration of colorless isocyanates, it was suggested to employ phosphorous containing compounds such as trialkyl phosphite, triaryl phosphites, dialkyl-aryl phosphites, diaryl alkyl phosphites. The addition of these compounds to isocyanates will, according to the prior art, prevent the formation of color bodies and will maintain the isocyanates colorless for extended periods. According to the prior art, however, the stabilizing effect will occur only before the formation of the color bodies.

It was now found that according to the present invention, the selective addition of diphenyl-decyl phosphite will decolorize discolored isocyanates and will enable the use of the isocyanates for purposes where the yellow or brownish color rendered the isocyanates unsuitable.

BRIEF SUMMARY OF THE INVENTION

Discolored methylene-diphenyl diisocyanates and polyisocyanates containing methylene-diphenyl diisocyanates are decolorized by the addition of diphenyl-decyl phosphite which selectively reacts with the color forming hydrolyzable chloride attached to the methylene bridge of the diisocyanate. The amount of diphenyl-decyl phosphite to be admixed with the isocyanate is sufficient to chemically bond substantially all of the methylene-bridge attached chloride, thereby decolorizing the colored isocyanate.

DETAILED DESCRIPTION OF THE INVENTION

Methylene-diphenyl diisocyanates and polyisocyanate containing the diisocyanates are commonly produced by the condensation of aniline with formaldehyde in the presence of an acid catalyst followed by phosgenation. Under predetermined reaction conditions a mixture of polyamines are produced, containing a substantial amount of diamines such as 4,4'-diamino-diphenyl methane and 2,4'-diamino-diphenyl methane. Upon phosgenation of the polyamines, the corresponding polyisocyanates are formed containing the diisocyanates. The phosgenation, which is usually accomplished at temperatures above 25° C., is accompanied by undesirable side reactions, such as chlorination of the methylene bridge connecting the phenyl groups. This side reaction which is believed to be the reason for color formation, is shown below:

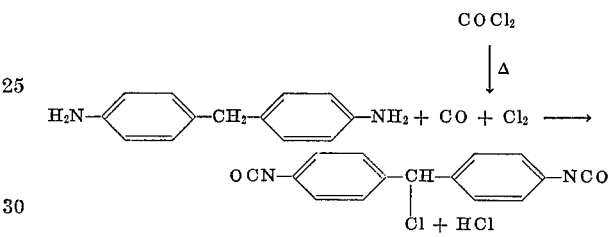

Even a small amount of methylene bridge attached chlorine causes discoloration and hydrolysis of the chlorine atom can further reduce the quality of the produced isocyanate.

It has been found that the addition of a phosphorous compound, diphenyl-decyl phosphite will selectively react with the color forming chlorine atom to provide a discoloring effect of polyisocyanates containing diisocyanates having methylene bridge attached chlorine atoms.

The reaction between the methylene-bridge attached chlorine and the diphenyl-decyl phosphite is believed to proceed according to the following equations:

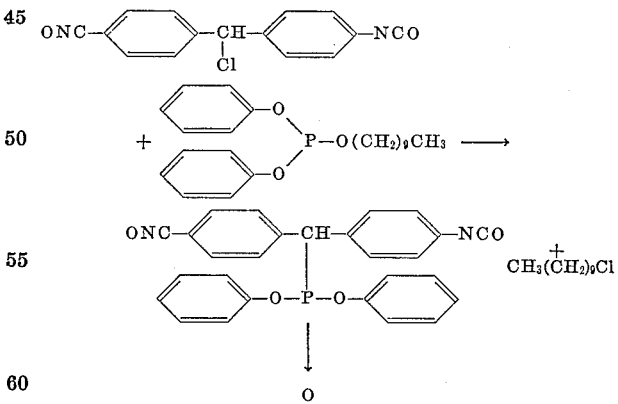

whereby the methylene-bridge attached chlorine will be removed from the bridge by the formation of decyl chloride. The resulting isocyanate will be of much lighter color or even colorless. The amount of diphenyl-decyl phosphite to be admixed with the discolored isocyanate depends on the number of chlorine atoms attached to the methylene-bridge of the isocyanate. According to the decolorizing process of the present invention, an amount of diphenyl-decyl phosphite is employed, which is sufficient to chemically bond substantially all of the methylene-bridge chlorine.

When conventional methods are utilized for the preparation of methylene-diphenyl diisocyanate or methylene-diphenyl diisocyanate containing polyisocyanates, the amount of diphenyl-decyl phosphite to be employed for accomplishing the decolorizing of the discolored isocyanate usually ranges from about 0.001 to about 5% by weight of the diisocyanate. For slightly discolored polyisocyanates, for best results there is employed an amount of from about 0.5% to about 3% by weight of the diisocyanate. It is to be understood that these ranges apply to isocyanates where the color of the discolored product ranges from light yellow to yellowish-brown. Where the color of the discolored isocyanate ranges from yellowish-brown to dark brown, higher amounts of diphenyl-decyl phosphite are employed to react with or chemically bond substantially all of the methylene-bridge attached chlorine. In the latter case the color of the discolored isocyanate will be still substantially lightened by the addition of the diphenyl-decyl phosphite in amounts sufficient to chemically combine with the methylene-bridged chlorine.

The reaction of the diphenyl-decyl phosphite with the diisocyanate or polyisocyanate can be accomplished by maintaining the temperature of the mixture of from about 20° C. to about 180° C. In order to obtain the best results, the isocyanate should be in liquid state which in some instances will require the preheating of solid isocyanate compositions to a temperature within the above range prior to the admixture with the diphenyl-decyl phosphite. If, however, the isocyanate is in liquid state at 20° C., the admixture with the diphenyl-decyl phosphite can be accomplished even at this temperature. After the admixture with sufficient amounts of diphenyl-decyl phosphite is complete, the admixture can be maintained at temperatures of from about 20° C. to about 180° C. for a time sufficient to lighten or remove the color of the discolored isocyanate. It is also possible to admix the diphenyl-decyl phosphite compound with the isocyanate at higher temperatures within the range provided. Temperatures higher than 180° C. can be employed; however, as isocyanates are usually unstable at elevated temperatures and may undergo decomposition or other chemical changes including darkening of their color at temperatures above 180° C., this temperature is considered as optimum to accomplish the decolorizing according to the present invention.

The decolorizing effect of the diphenyl-decyl phosphite can be observed within minutes after the admixture with the isocyanate. For best results, it is preferred to maintain the admixture containing the diphenyl-decyl phosphite of from about 10 minutes to about 3 hours within the temperature ranges of from about 20° C. to about 180° C. It will be self-evident to men skilled in the art, that the darker the color of the isocyanate, the longer the time period required to decolorize the discolored compound within the given temperature limits. Also, at lower temperatures, the decolorizing may proceed at a lower rate. The time and the temperature to be chosen, within the above limits is therefore optional and is adapted to the polyisocyanate composition containing the methylene-diphenyl diisocyanate and to the desired color of the end product.

It was surprisingly found that the decolorizing effect described above cannot be attributed to all of the organic phosphites found to be suitable for stabilizing isocyanates against color formation. Tests conducted with organic phosphites, such as diphenyl phosphite, dipentite phosphite, triphenyl phosphite did not provide discoloration of discolored isocyanates containing methylene-bridged chlorine atoms. Slight color improvements were found in some instances but in no case was the excellent decolorizing property of diphenyl-decyl phosphite observed. The selectivity of the diphenyl-decyl phosphite for decolorizing the discolored isocyanate containing methylene-bridged chlorine atom is not fully understood, but without being bound to any particular theory, it is believed to be a result of the quinoid structure of the methylene-bridge substituted diisocyanate which will provide a labile chlorine atom on the methylene-bridge. This labile chlorine atom will readily react with the diphenyl-decyl phosphite, which reaction will then provide the discoloring effect.

The table below provides comparison between the decolorizing effect of diphenyl-decyl phosphite and several other organic phosphites tested for improving the color of diisocyanates and polyisocyanates containing methylene-diphenyl diisocyanates having methylene-bridge attached chlorine capable of reacting with the decolorizing agent.

TABLE I

Comparison on the decolorizing effect of organic phosphites on discolored polyisocyanates containing methylene diphenyl diisocyanates.

| Compound, 2% by weight of the diisocyanate | Color Before treatment | Color After treatment [1] | Treatment time in minutes | Treatment temperature (° C.) |
|---|---|---|---|---|
| Diphenyl-decyl phosphite | Yellow | Very slight yellow | 60 | 100–110 |
| Do | Light yellow | Colorless | 60 | 125–135 |
| Diphenyl phosphite | Yellow | Dark yellow | 60 | 120–125 |
| Triphenyl phosphite | Light yellow | Light yellow | 60 | 140 |
| Dipentite phosphite | Yellow | Dark yellow | 60 | 135 |
| Trimethyl phosphite | do | Decomp | 90 | 100–110 |
| Phenyl-ethylene phosphite | do | Dark yellow | 60 | 145–155 |
| Tridecyl phosphite | Light yellow | do | 60 | 100 |

[1] After treatment with the organic phosphites, each of the treated isocyanates were admixed with equal amounts of a 1,4-butanediol based polyol having a molecular weight of 1,000. The isocyanate-polyol admixtures were heated at 130° C. for 30 minutes and the produced prepolymers were extended with 1,4-butane diol, and the resulting polymers were cured for 16 hours at 100° C. After curing, the color of the polymers were compared and listed in the table.

To further illustrate the novel decolorizing process of the present invention, the following examples are provided, without, however, limiting the scope of the inventive process.

EXAMPLE I

To 100 grams molten discolored polyisocyanate containing 66 grams of methylene-diphenyl diisocyanate 1.2 grams of diphenyl-decyl phosphite was added. The admixture was heated to 100° C. and maintained at this temperature for 1 hour under continuous stirring. Subsequently, the admixture was cooled and vacuum distilled and the colorless methylene-diphenyl diisocyanate distillate recovered. The initial hydrolyzable chloride content of 0.11% was reduced to 0.08% and the yellow color of the isocyanate was completely eliminated.

25 grams of the distillate was heated to 60° C. and was admixed with approximately 33 grams of a 1,4-butanediol based polyol having an average molecular weight of about 1000. The admixture was heated to 130° C. for a period of 30 minutes and a prepolymer was recovered. The prepolymer was extended with 6 grams of 1,4-butanediol and cured for 16 hours at 100° C. The material was light yellow in color and measured 4 on the Gardner scale. The untreated starting material measured 12 on the Gardner scale.

For comparison purposes, a 100 gram sample of untreated polyisocyanate of the same color as the above, was distilled and a cured polymer was prepared. The control sample provided a reading of 13 on the Gardner scale on the unexposed surfaces and a reading of 16 on the Gardner scale on air-exposed surfaces.

EXAMPLE II

To 100 grams of deeply yellow colored methylene-diphenyl diisocyanate having some methylene-bridge attached chlorine atoms and reading 10 on the Gardner scale, 2 grams of diphenyl-decyl phosphite were added. The admixture was maintained under stirring at 100° C. for a period of 1 hour. The color of the discolored isocyanate gradually decreased during this period and after 1 hour a reading of 1 was obtained on the Gardner scale. The decolorized isocyanate was then distilled. The distillate was colorless and remained so for an extended period. Polymer made from the distillate, according to the process describe in Example I, was also light in color.

A control distillate of untreated polyisocyanate turned yellow (6 on Gardner scale) within a few hours.

EXAMPLE III 100 grams of yellow colored methylene-diphenyl diisocyanate having some methylene-bridge attached chlorine atoms and reading 10 on the Gardner scale, were melted and 0.2 gram of diphenyl-decyl phosphite was added under stirring. The color of the melt immediately lightened and after a 15 minute period, the melt was slowly cooled under a nitrogen atmosphere and crystallized. The cooled methylene-diphenyl diisocyanate was composed of 54% by weight of crystals and 46% by weight of mother liquid. The crystals measured 1 on the Gardner scale and the mother liquid measured 4 on the same scale.

All color measurements were done on a Gardner-Hellige Varnish Comparator Model No. 605–VH.

It will be understood that various changes, additions and variations may be made to this invention without departing from the spirit and scope thereof as set forth in the appended claims.

What is claimed is:

1. A process for decolorizing discolored methylene-diphenyl diisocyanate which comprises (a) admixing discolored diisocyanate in the liquid state with sufficient diphenyl-decyl phosphite to chemically bond substantially all hydrolyzable chloride present in said diisocyanate as methylene-bridge attached chloride, and
   (b) maintaining the admixture at a temperature of from about 20° to about 180° C. until said admixture is substantially lightened in color.

2. Process according to claim 1, wherein the amount of diphenyl-decyl phosphite is from about 0.001 to about 5% by weight of the diisocyanate.

3. Process according to claim 1 wherein the amount of diphenyl-decyl phosphite is from about 0.5 to about 3% by weight of the diisocyanate.

4. Process according to claim 1, wherein the time period for substantially lightening the color of said discolored isocyanate is from about 10 minutes to about 3 hours.

5. The process of claim 1 wherein said discolored methylene-diphenyl diisocyanate is present in liquid polyisocyanate prepared by acid condensation of aniline with formaldehyde and phosgenation of resultant condensate.

References Cited

UNITED STATES PATENTS 2,957,903 10/1960 Spiegler _____ 260—453
3,155,699 11/1954 Powers _____ 260—453
3,305,574 2/1967 Zecher et al. _____ 260—453

CHARLES B. PARKER, Primary Examiner

D. H. TORRENCE, Assistant Examiner

U.S. Cl. X.R.

260—45.7, 570, 939, 969